(12) United States Patent
Kumar et al.

(10) Patent No.: US 8,782,730 B2
(45) Date of Patent: Jul. 15, 2014

(54) USER ASSISTANCE VIA CUSTOMER PREMISES EQUIPMENT MEDIA FILES

(75) Inventors: Shiv Kumar, Marlboro, NJ (US); Paritosh Bajpay, Edison, NJ (US); John Michael Donovan, San Antonio, TX (US); Narendra Ravi, Howell, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 239 days.

(21) Appl. No.: 12/964,540

(22) Filed: Dec. 9, 2010

(65) Prior Publication Data

US 2012/0151549 A1    Jun. 14, 2012

(51) Int. Cl.
*H04N 7/173* (2011.01)
*H04N 17/00* (2006.01)
*H04N 17/02* (2006.01)

(52) U.S. Cl.
USPC ................ 725/131; 725/107; 348/180

(58) Field of Classification Search
None
See application file for complete search history.

(56) References Cited

U.S. PATENT DOCUMENTS

| | | | | | |
|---|---|---|---|---|---|
| 4,963,967 | A | * | 10/1990 | Orland et al. | 348/484 |
| 6,005,569 | A | * | 12/1999 | Breggin | 715/711 |
| 6,023,724 | A | | 2/2000 | Bhatia et al. | |
| 6,205,579 | B1 | * | 3/2001 | Southgate | 717/173 |
| 6,452,915 | B1 | | 9/2002 | Jorgensen | |
| 6,535,865 | B1 | * | 3/2003 | Skaaning et al. | 706/52 |
| 6,658,598 | B1 | * | 12/2003 | Sullivan | 714/25 |
| 6,826,512 | B2 | | 11/2004 | Dara-Abrams et al. | |
| 7,200,527 | B1 | * | 4/2007 | Davidov et al. | 702/186 |
| 7,392,301 | B1 | | 6/2008 | Perry, Jr. et al. | |
| 8,094,568 | B1 | | 1/2012 | Croak et al. | |
| 2002/0167936 | A1 | | 11/2002 | Goodman | |
| 2002/0167937 | A1 | * | 11/2002 | Goodman | 370/352 |
| 2003/0023980 | A1 | * | 1/2003 | Kikinis et al. | 725/100 |
| 2003/0137587 | A1 | * | 7/2003 | Braun | 348/181 |
| 2003/0163380 | A1 | | 8/2003 | Vaccarelli et al. | |
| 2004/0019691 | A1 | | 1/2004 | Daymond et al. | |
| 2004/0056958 | A1 | * | 3/2004 | Lee | 348/207.1 |
| 2005/0025162 | A1 | | 2/2005 | Binder | |
| 2005/0081118 | A1 | | 4/2005 | Cheston et al. | |
| 2005/0183130 | A1 | | 8/2005 | Sadja et al. | |
| 2006/0098742 | A1 | * | 5/2006 | Meenakshisundaram et al. | 375/240.27 |
| 2006/0167844 | A1 | * | 7/2006 | Srinivas et al. | 707/3 |
| 2006/0233313 | A1 | | 10/2006 | Adams, Jr. et al. | |
| 2007/0047449 | A1 | | 3/2007 | Berger et al. | |
| 2007/0050836 | A1 | | 3/2007 | Stanek et al. | |
| 2007/0192800 | A1 | * | 8/2007 | Walter et al. | 725/53 |
| 2008/0022336 | A1 | | 1/2008 | Howcroft et al. | |
| 2008/0126250 | A1 | | 5/2008 | Chen | |
| 2008/0133978 | A1 | | 6/2008 | Angamuthu et al. | |

(Continued)

OTHER PUBLICATIONS

U.S. Appl. No. 12/545,940, filed Aug. 24, 2009.

(Continued)

*Primary Examiner* — Nathan Flynn
*Assistant Examiner* — William J Kim
(74) *Attorney, Agent, or Firm* — Toler Law Group, PC

(57) ABSTRACT

A particular customer premises equipment (CPE) device includes a display interface, a processor, and a memory accessible to the processor. The memory includes a plurality of media files that include user assistance information. The memory also includes instructions executable by the processor to access a media file of the plurality of media files and, in response to a user request for assistance, send content of the media file to a display device via a display interface.

18 Claims, 3 Drawing Sheets

(56) References Cited

U.S. PATENT DOCUMENTS

| | | |
|---|---|---|
| 2008/0192119 A1 | 8/2008 | Li et al. |
| 2008/0250443 A1 | 10/2008 | Fan et al. |
| 2008/0267215 A1 | 10/2008 | Blackburn et al. |
| 2008/0288977 A1 | 11/2008 | Howcroft et al. |
| 2009/0064251 A1 | 3/2009 | Savoor et al. |
| 2009/0092126 A1* | 4/2009 | Flynn et al. .................. 370/352 |
| 2009/0125953 A1 | 5/2009 | Porter et al. |
| 2009/0161530 A1 | 6/2009 | Yang et al. |
| 2009/0232008 A1 | 9/2009 | Wurst et al. |
| 2009/0299699 A1* | 12/2009 | Wu ................................ 702/186 |
| 2009/0307612 A1* | 12/2009 | Singh et al. ................... 715/758 |
| 2010/0023994 A1 | 1/2010 | Taylor et al. |
| 2010/0054136 A1 | 3/2010 | Mehta et al. |
| 2010/0332906 A1 | 12/2010 | Agrawal et al. |
| 2011/0113290 A1 | 5/2011 | Chana et al. |
| 2011/0225619 A1 | 9/2011 | Kesireddy et al. |

OTHER PUBLICATIONS

U.S. Appl. No. 12/727,931, filed Mar. 19, 2010.

* cited by examiner

USER ASSISTANCE VIA CUSTOMER PREMISES EQUIPMENT MEDIA FILES

BACKGROUND

Systems that provide onboard diagnostic functionality for set-top box devices and other customer premises equipment have been used to assist service providers in determining what is causing functional problems with the set-top box device or other residential equipment. However, such systems may be hindered when a problem with a set-top box device or other customer premises equipment interrupts a connection to the service provider. For example, the service provider may not be able to access diagnostic information or provide useful customer assistance to the user.

DETAILED DESCRIPTION

In a particular embodiment, a CPE device includes a display interface, a processor, and a memory accessible to the processor. The memory includes a plurality of media files that include user assistance information. The memory also includes instructions executable by the processor to access a media file of the plurality of media files and, in response to a user request for assistance, to send content of the media file to a display device via a display interface.

In another particular embodiment, a method includes, at a CPE device storing a plurality of user assistance media files, receiving a user request to tune the CPE device to a troubleshooting channel. The method also includes accessing a particular user assistance media file and sending content of the particular user assistance media file to a display device.

In another particular embodiment, a non-transitory computer-readable medium includes instructions that, when executed by a processor, cause the processor to receive a user request to tune a CPE device to a troubleshooting channel. The CPE device stores a plurality of user assistance media files. The instructions are also executable to access a particular user assistance media file and to send content of the particular user assistance media file to a display device. The instructions are further executable to perform one or more diagnostic tests at the CPE device, to generate log information that indicates results of the one or more diagnostic tests, and to transmit the log information to a customer assistance agent associated with a service provider. The instructions are executable to receive an updated user assistance media file from the service provider and to send content of the updated user assistance media file to the display device.

Figure 1:
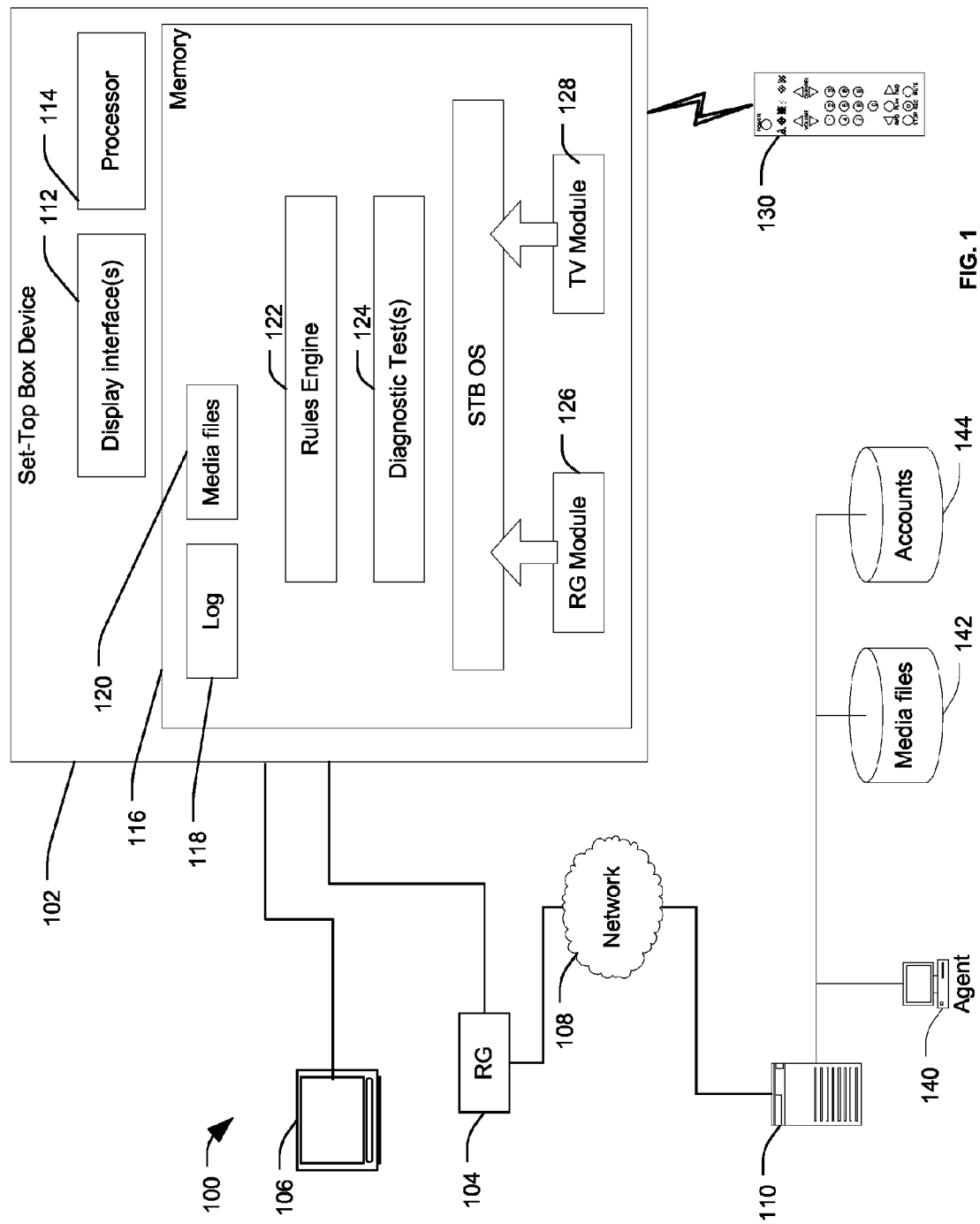
FIG. 1 is a block diagram illustrating a particular embodiment of a system operable to provide user assistance based on media files at a customer premises equipment (CPE) device.

FIG. 1 illustrates a particular embodiment of a system 100 including a set-top box device 102 with onboard diagnostics 124. The set-top box device 102 may be coupled to a display device, such as illustrative television 106. Additionally, the set-top box device 102 may be coupled to a network 108. For example, the set-top box device 102 may be coupled through a residential gateway 104 to the network 108 and maybe coupled via the network 108 to one or more servers of a service provider, such as illustrative server 110. The network 108 may include a public network or a private access network such as an Internet Protocol Television (IPTV) network, a cable access network, or a satellite television access network. The set-top box device 102 may be adapted to receive content from the service provider server 110 via the network 108. It should be noted that although the embodiments herein are described with reference to a set-top box device, user assistance may also be provided via files located at other customer premises equipment (CPE) devices, such as a residential gateway or a micro-cell (e.g., a Femtocell) device. To illustrate, in an alternate embodiment, selected components of the set-top box device 102 (e.g., the onboard diagnostics 124) may be located at the residential gateway 104.

The set-top box device 102 may include a display interface 112 adapted to receive content from a service provider via the network 108 and to generate a display for presentation at the television 106. Additionally, the set-top box device 102 may include a processor 114. The processor 114 may be adapted to access instructions stored at a memory 116 of the set-top box device 102. The processor 114 may implement the instructions stored at the memory 116 to execute one or more applications, modules, logic, or functions of the set-top box device 102. For example, the processor 114 may implement a television module 128 to process content received from the content provider for display at the television 106. In another example, the set-top box device 102 may implement a residential gateway module 126 in order to perform communications with the residential gateway 104. For example, the residential gateway module 126 may include particular protocol information implemented to communicate with the set-top box device 102 and the residential gateway 104. In another example, the processor 114 may be adapted to receive and implement commands from a remote control device 130 (e.g., to change a channel presented via the television 106).

The set-top box device 102 may include a rules engine 122. The rules engine 122 may be adapted to identify problems with the set-top box device 102, with a connection between the set-top box device 102 and the residential gateway 104, with a connection between the residential gateway 104 and the network 108, with a connection between the residential gateway 104 and the service provider server 110, or any combination thereof. In a particular embodiment, the rules engine 122 may implement or execute the diagnostic tests 124 that are stored as instructions onboard the set-top box device 102. For example, the diagnostic tests 124 may include testing a picture quality of an output signal of the set-top box device 102, testing a connectivity between the set-top box device 102 and the residential gateway 104, testing a connectivity between the residential gateway 104 and the network 108, or any combination thereof. The diagnostic tests 124 may also include testing a wireless connectivity (e.g., IEEE 802.11 connectivity) associated with the residential gateway 104, testing a local area network (LAN) connectivity associated with the residential gateway 104, or any combination thereof. In response to detecting a particular problem, the set-top box device 102 may generate log information that is stored at a log 118 in the memory 116 of the set-top box device 102.

In a particular embodiment, the set-top box device 102 may be adapted to receive requests from a user for user assistance information. For example, the request for user assistance information may be received via the remote control device 130. In a particular embodiment, the request for user assistance information may be received via a search query that is input via a keyboard or keypad of the remote control device 130. In another example, the remote control device 130 may include a microphone and the request for user assistance may be provided via a voice command from the remote control device 130. The request for user assistance information may include a request for particular help content, particular frequently asked questions (FAQ) information, user account information, or other information that may be accessible via the content provider server 110.

In a particular embodiment, the set-top box device 102 includes a plurality of media files 120. The media files 120 may be stored at the memory 116 of the set-top box device 102. Accordingly, even when a connection between the set-top box device 102 and the network 108 is disrupted (e.g., due to a failure at the residential gateway 104 or disruption of a connection between the set-top box device 102, the residential gateway 104, and the network 108), the set-top box device 102 remains able to access the media files 120. The processor 114 may access one or more of the media files 120 in response to the user request for user assistance information. The processor 114 may process the selected media file of the media files 120 and may send content of the selected media files to the television 106 for display to the user.

In a particular embodiment, in response to a user request for user assistance information, the set-top box device 102 may implement a rules engine 122. The rules engine 122 may determine context information associated with the request. For example, the rules engine 122 may determine that a particular event has occurred at the set-top device 102 or that an event has occurred that is detectable by the set-top box device 102. For example, in response to detecting a loss of connection to the network 108, one or more diagnostic tests 124 may be initiated. The diagnostic tests 124 may be implemented to determine a source, cause, or reason for the lost connection. The particular selected media file 120 provided to the television 106 may be associated with results of the diagnostic tests 124 or results of particular rules implemented by the rules engine 122. For example, when the rules engine 122 or the diagnostic tests 124 determine that the connection to the network 108 has been lost, the media file 120 may be associated with resetting the connection to the network 106 or with troubleshooting the connection to the network 108. For example, the selected media file 120 may instruct the user how to perform particular steps to reset the connection to the network 108. To illustrate, the media file 120 may include a how-to video that includes a step-by-step demonstration of particular user assistance actions, such as resetting the set-top box device 102 and the residential gateway 104.

In a particular embodiment, the content provider server 110 may designate a particular channel as a troubleshooting channel. Accordingly, a user may select the troubleshooting channel using the remote control device 130 in order to cause the set-top box device 102 to implement the rules engine 122 to identify particular problems that may be affecting the set-top box device 102. Thus, tuning the set-top box device 102 to the troubleshooting channel may be another way the user can request user assistance information, and may thus be interpreted by the set-top box device 102 as a user request for assistance.

In a particular embodiment, the rules engine 122 is able to access user account information from the content provider server 110. For example, the content provider server 110 may have access to the user account information 144 indicating subscription tier information, account payment history information, parental controls or other access restrictions, or other information associated with the user's subscriber account that may affect whether the particular actions can be performed at the set-top box device 102. For example, when a subscriber requests a channel that is associated with a premium subscription tier and the subscriber account is not associated with the premium subscription tier, the rules engine 122 may access the account information 144 to determine that a subscription tier associated with the set-top box 102 does not allow the particular channel to be displayed. Accordingly, the rules engine 122 may generate and present user assistance information via the television 106 indicating that the user's subscription tier does not support the particular action to be performed. The user may also be prompted to upgrade to the premium subscription tier.

In a particular embodiment, the set-top box device 102 is adapted to generate a log 118 including information related to user requests for assistance. The log 118 may include information related to the user-requested assistance, results of the diagnostics tests 124, or any combination thereof. The log 118 may be sent occasionally or periodically to the content provider server 110. For example, the set-top box device 102 may transmit logged information to the content provider server 110 (i.e., via a "push" mechanism) or the content provider server 110 may request the logged information (i.e., via a "pull" mechanism). The service provider server 110 may use the logged information from the log 118 to identify problems with the set-top box device 102, problems at points on a connection path between the set-top box device 102 and the content provider server 110, or any combination thereof.

In a particular embodiment, when a particular issue is identified, the service provider server 110 may provide the logged information to an agent 140 (e.g., a customer assistance agent or a technical support agent) of the service provider. The agent 140 may contact the user associated with the set-top box device 102 or may implement corrective actions from the service provider side in order to correct the issue.

In a particular embodiment, the system 100 may enable troubleshooting of telephone audio. For example, a customer may subscribe to voice services (e.g., voice over Internet protocol (VoIP) services) in addition to video (e.g., IPTV) services. The media files 120 may include one or more benchmark audio files that are played over a phone circuit (not shown). A voice or audio processor (e.g., incorporated into the processor 114 of the set-top box device 102) may "listen" to the played files to determine playback time and audio characteristics. The playback time and audio characteristics may be analyzed (e.g., at the residential gateway 104 or at the content provider server 110) to identify, diagnose, and recommend corrective actions for telephone audio quality problems.

In another particular embodiment, the system 100 may enable troubleshooting of video services. For example, a customer may experience synchronization issues between video data and audio data of an IPTV program (e.g., a television channel or a video on demand (VOD) program). The media files 120 may include one or more benchmark video files that are played via the set-top box device 102 at the display device 106. The playback may be monitored to check channel buffers for matching audio and video position markers that are embedded in the benchmark files. Discrepancies in the audio and video position markers may be identified and used for troubleshooting purposes. Data description of the discrepancies may also be stored for later retrieval by a customer service agent (e.g., the agent 140) for further analysis.

As another example, a customer may experience degradation in video quality. The media files 120 may include benchmark photographs or video files that are played via the set-top box device 102 at the display device 106. The customer may be prompted to identify visual indicators or other characteristics that would be present in the photographs or video files when there is no video quality degradation. If the user is unable to identify a particular visual indicator or characteristic, such information may be used for troubleshooting purposes. The information may also be stored for later retrieval by a customer service agent (e.g., the agent 140) for further analysis.

In another particular embodiment, the logged information from the log 118 may be provided to the content provider server 110 and may be used to select updated media files 142 to download to the set-top box device 102 for storage in the memory 116. The log 118 may thus trigger updates to the media files 120. For example, the log information 118 may be analyzed in conjunction with other log information associated with other subscribers and other set-top box devices to determine frequently occurring or system-wide problems. The updated media files 142 may be generated and may be downloaded to one or more set-top box devices, such as the set-top box device 102. The updated media files 142 may be transmitted to the set-top box device 102 to facilitate customer assistance in response to the frequently occurring problem, or may be transmitted to the set-top box device 102 proactively (e.g., in order to facilitate assistance should the frequently occurring problem occur at the set-top box device 102).

Additionally or in the alternative, the log 118 may include information indicating steps performed by the subscriber to attempt to correct the problem. For example, when the particular user assistance media file 120 has been presented to the user, and the user has performed one or more steps of the corrective action identified in the media file, the log 118 may indicate which steps were performed and/or which steps were omitted.

Thus, the system 100 may enable improved customer service to diagnose and correct problems associated with the set-top box device 102, equipment coupled to the set-top box device 102, and the service provider. Further, the system 100 may enable users to self-correct problems without making calls into a customer assistance center of the service provider. Rather, the set-top box device 102 may store media files 120 that provide user assistance information to enable a customer to diagnose and correct the problem at the set-top box device 102. The self corrective actions may be supplemented or facilitated by the onboard diagnostics 124 and the rules engine 122 that help the user identify problems and present and demonstrate particular corrective actions via the media files 120.

Figure 2:
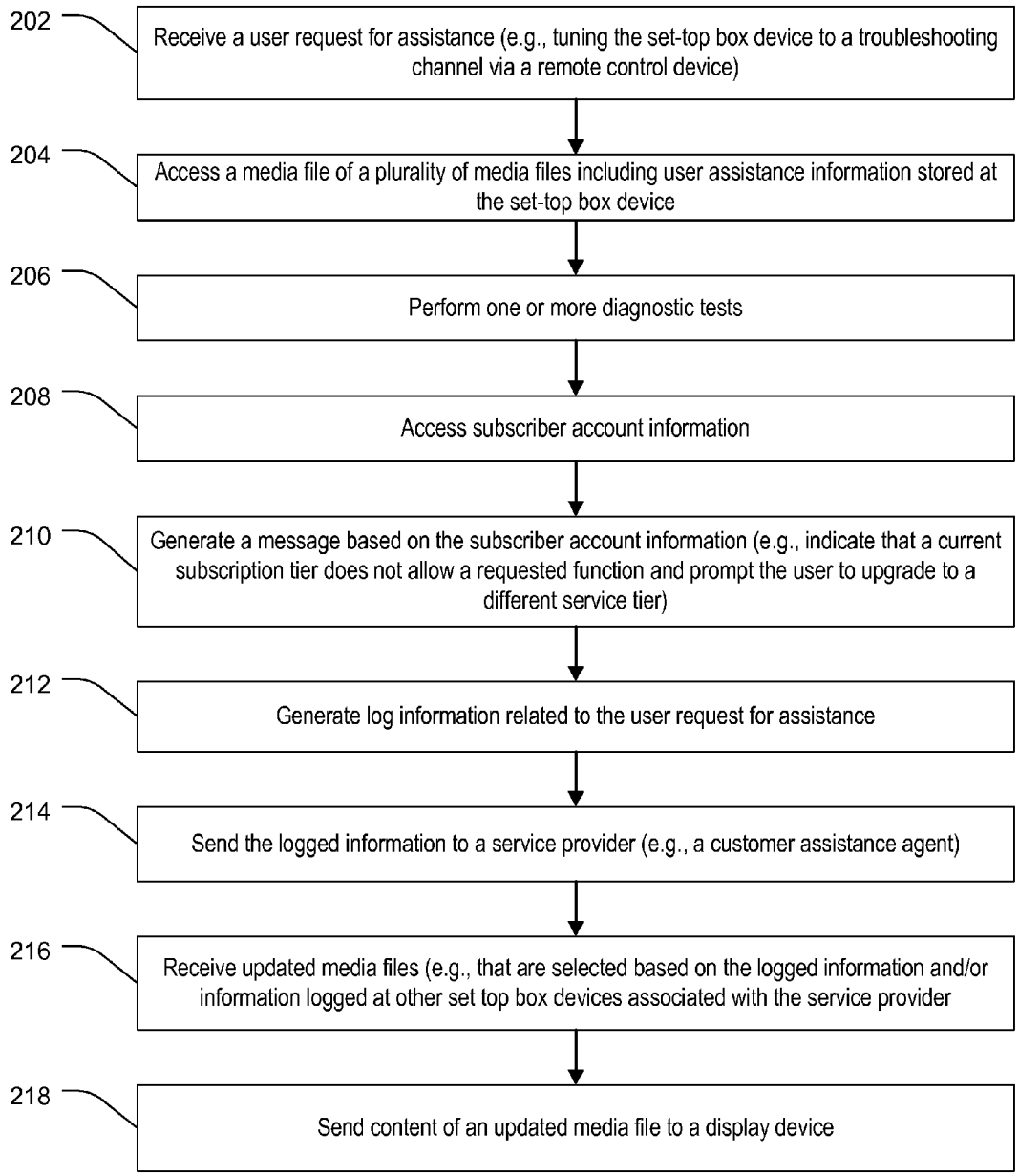
FIG. 2 is a flow diagram illustrating a particular embodiment of a method of providing user assistance based on media files at a CPE device.

FIG. 2 is a flow chart of a particular embodiment of a method of providing user assistance information based on media files at a set-top box device. In an illustrative embodiment, the method may be performed at the system 100 of FIG. 1.

The method includes, at 202, receiving a user request for assistance. For example, the user request for assistance may be received in response to a user tuning to a troubleshooting channel at the set-top box device. In another example, the user request for assistance may be received via search criteria associated with specific assistance that the user desires. In yet another example, the user request for assistance may be provided to the set-top box device, such as the set-top box device 102 of FIG. 1, via the remote control device 130, or via a voice entry at the remote control device 130.

The method may also include, at 204, accessing a media file of a plurality of media files that include user assistance information. The plurality of media files may be stored at the set-top box device. For example, the method may include accessing one or more of the media files 120 of FIG. 1. In a particular embodiment, the media files may include video segments demonstrating performance of particular user assistance actions. For example, the media files may include a video performance of power cycling the set-top box device, checking a connection between the set-top box device and the residential gateway, power cycling the residential gateway, checking a connection between the residential gateway and another network device, other assistance information to correct a connection between the set-top box device and the service provider, or any combination thereof.

The method may further include, at 206, performing one or more diagnostic tests. For example, the diagnostic tests may include testing a connection between the set-top box device 102 of FIG. 1 and the residential gateway 104, testing a connection between the residential gateway 104 and another network device of the network 108, checking other connections or device functions, or any combination thereof.

The method may include, at 208, accessing subscriber account information. For example, subscriber account information may be associated with the particular set-top box device at which the user request for assistance was received. The subscriber account information may include information such as a subscriber service tier associated with the set-top box device 102 of FIG. 1, parental access controls of the set-top box device 102, account payment status information, or other information that may affect whether particular actions may be performed at the set-top box device 102.

The method may also include, at 210, generating a message based on the subscriber account information. For example, when a current subscription tier associated with the set-top box device does not allow a requested function, the message may provide this information to the subscriber via a display device. The message may also prompt the user to upgrade to a different service tier in order to perform the requested function.

The method may further include, at 212, generating log information related to the user request for assistance. For example, the log information may be stored at the memory 116 of the set-top box device 102 of FIG. 1 (e.g., as the log 118). The logged information may include information identifying actions performed to correct one or more issues at the set-top box device. For example, the actions performed may include actions performed by the user or actions automatically performed by the set-top box device in order to self-correct a detected problem. Additionally, the logged information may include contextual information such as a particular channel that was being watched when the request for assistance was received, a particular action that prompted the request for assistance, results of diagnostic tests performed by the set-top box device, or any combination thereof.

At 214, the logged information may be sent to a service provider. For example, logged information may be sent to a customer assistance agent of the service provider. The customer assistance agent may use the log information to identify particular issues associated with the set-top box device or to respond to the request for user assistance information. For example, the customer assistance agent may contact the subscriber associated with the set-top box device in order to provide the user assistance information. To illustrate, the customer assistance agent may generate a call to residents associated with the set-top box device. In another example, the customer assistance agent may send text information to the set-top box device via a network in order to provide user assistance information. In yet another example, the customer assistance agent may send particular media content (e.g., as an update to previously stored media files) to the set-top box device, such a video segment demonstrating how to perform a particular corrective action at the set-top box device. In another example, a customer assistance agent may dispatch one or more technicians in order to address a particular concern at the set-top box device or between the service provider and the set-top box device.

The method may further include, at 216, receiving updated media files. The updated media files may be selected based on the logged information. The updated media files may also be selected based on information logged at other set-top box devices associated with the service provider. For example, when a plurality of subscribers associated with the service provider have experienced a particular issue or requested information regarding certain functionality, the service provider may choose to push updated media files to set-top box devices associated with the same subscriber or with other subscribers in order to facilitate providing user assistance information to the subscribers. The method may include, at 218, sending content of an updated media file to a display device.

Accordingly, particular embodiments disclosed may enable improved communication of user assistance information to subscribers. In particular, subscribers may access user assistance information stored onboard a set-top box device even when there are communication problems that would prevent sending the service provider from sending the user assistance information to the subscriber at the time of the user request for assistance. For example, even when a network is non-functional and does not allow communication with the subscriber via the set-top box device, via a telephone call, or via other communication, the subscriber may nonetheless access the stored media files in order to attempt self-correcting actions.

Additionally, an onboard rules engine and diagnostic tests at the set-top box device may facilitate selection of particular media content to provide the requested information to the user. For example, when the subscriber does not know what is causing the particular problem, the subscriber may not know which particular media file to select for presentation at a television. However, diagnostic information may be used in conjunction with the rules engine to select a particular media file that demonstrates how to correct the problem. The media files may also include answers to frequently asked questions or other content that may be useful to the subscriber, though not associated with the particular ongoing problem at the set-top box device. Thus, providing the media content onboard the set-top box device and pushing the content from the service provider to the set-top box device at a time selected by the service provider may facilitate an improved customer experience. Moreover, this may reduce strain on call centers and other service provider servers or agents. Further, since the set-top box device is enabled to access subscriber account information, subscribers may beneficially access account information via the set-top box device without involving a customer assistance agent (e.g., to add or remove services, to upgrade or downgrade to a different subscription tier, etc.).

It should be noted that although the embodiments described herein are with reference to a set-top box device, user assistance may alternately be provided based on media files stored at other customer-side devices. For example, a television may directly be coupled to a residential gateway instead of to a set-top box device. In such an embodiment, the user assistance methods disclosed herein may be performed at the television or at the residential gateway.

Figure 3:
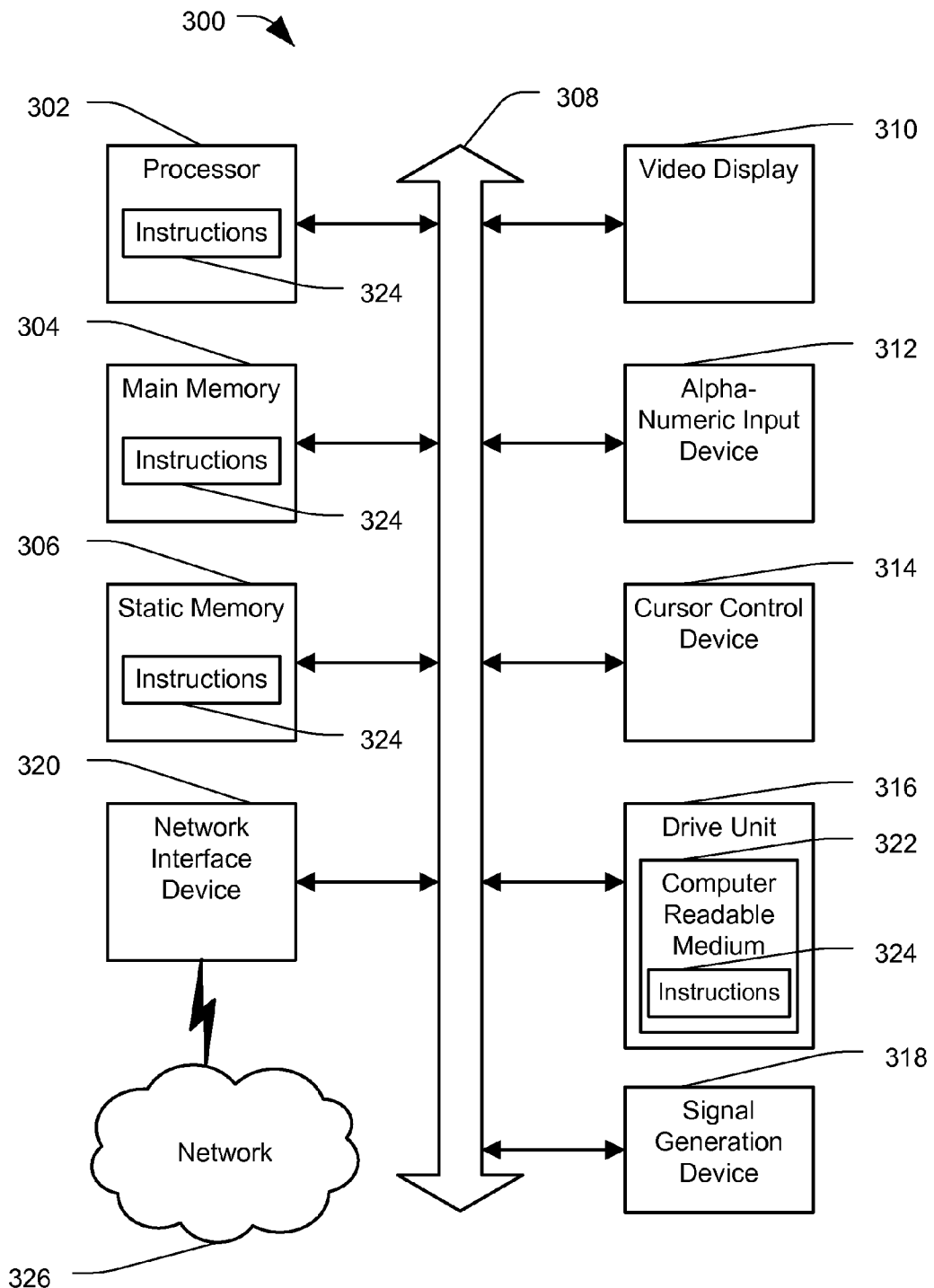
FIG. 3 is a block diagram of an illustrative embodiment of a general computer system.

Referring to FIG. 3, an illustrative embodiment of a general computer system is shown and is designated 300. For example, various components of the computer system 300 may include, implement, or be included within the set-top device 102 of FIG. 1, the residential gateway 104 of FIG. 1, the server 110 of FIG. 1, components thereof, or any combination thereof.

The computer system 300 includes a set of instructions that can be executed to cause the computer system 300 to perform any one or more of the methods or computer based functions disclosed herein. The computer system 300, or any portion thereof, may operate as a standalone device or may be connected, e.g., using a network, to other computer systems or peripheral devices.

In a networked deployment, the computer system 300 may operate in the capacity of a set-top box device, a server, or a mobile computing device. The computer system 300 can also be implemented as or incorporated into various devices, such as a personal computer (PC), a tablet PC, a personal digital assistant (PDA), a mobile device, a palmtop computer, a laptop computer, a desktop computer, a communications device, a web appliance, or any other machine capable of executing a set of instructions (sequential or otherwise) that specify actions to be taken by that machine. In a particular embodiment, the computer system 300 can be implemented using electronic devices that provide voice, video or data communication. Further, while a single computer system 300 is illustrated, the term "system" shall also be taken to include any collection of systems or sub-systems that individually or jointly execute a set, or multiple sets, of instructions to perform one or more computer functions.

As illustrated in FIG. 3, the computer system 300 may include a processor 302, e.g., a central processing unit (CPU), a graphics-processing unit (GPU), or both. Moreover, the computer system 300 can include a main memory 304 and a static memory 306 that can communicate with each other via a bus 308. As shown, the computer system 300 may further include or be coupled to a video display unit 310, such as a liquid crystal display (LCD), an organic light emitting diode (OLED), a flat panel display, a solid-state display, or a projection display. For example, the video display unit 310 may be the television 106 of FIG. 1. Additionally, the computer system 300 may include an input device 312, such as a keyboard, a remote control device, and a cursor control device 314, such as a mouse. The computer system 300 can also include a disk drive unit 316, a signal generation device 318, such as a speaker or remote control device, and a network interface device 320. The network interface device 320 may be coupled to other devices (not shown) via a network 326.

In a particular embodiment, as depicted in FIG. 3, the disk drive unit 316 may include a non-transitory computer-readable medium 322 in which one or more sets of instructions 324, e.g., software, can be embedded. For example, the instructions 324 may enable the computer system 300 to perform one or more methods or logic described herein. In a particular embodiment, the instructions 324 may reside completely, or at least partially, within the main memory 304, the static memory 306, and/or within the processor 302 during execution by the computer system 300. The main memory 304 and the processor 302 also may include non-transitory computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/item distributed processing, and parallel processing. Alternatively, virtual computer system processing can be constructed to implement one or more of the methods or functionality as described herein.

The present disclosure contemplates a non-transitory computer-readable medium that includes instructions 324 so that a device connected to a network 326 can communicate voice, video or data over the network 326. Further, the instructions 324 may be transmitted or received over the network 326 via the network interface device 320. For example, the network 326 may be the network 108 of FIG. 1.

While the non-transitory computer-readable medium is shown to be a single medium, the terms "non-transitory computer-readable medium" and "non-transitory processor-readable medium" include a single medium or multiple media, such as a centralized or distributed database, and/or associated caches and servers that store one or more sets of instructions. The terms "non-transitory computer-readable medium" and "non-transitory processor-readable medium" shall also include any medium that is capable of storing a set of instructions for execution by a processor or that cause a computer system to perform any one or more of the methods or operations disclosed herein.

In a particular non-limiting, exemplary embodiment, the non-transitory computer-readable medium can include a solid-state memory such as a memory card or other package that houses one or more non-volatile read-only memories. Further, the non-transitory computer-readable medium can be a random access memory or other volatile re-writable memory. Additionally, the non-transitory computer-readable medium can include a magneto-optical or optical medium, such as a disk or tapes. Accordingly, the disclosure is considered to include any one or more of a non-transitory computer-readable storage medium and successor media, in which data or instructions may be stored.

It should also be noted that software that implements the disclosed methods may optionally be stored on a tangible storage medium. For example, the tangible storage medium may include a magnetic medium such as a disk or tape. As another example, the tangible storage medium may include a magneto-optical or optical medium such as a disk. As yet another example, the tangible storage medium may include a solid state medium such as a memory card or other package that houses one or more read-only (non-volatile) memories, random access memories, or other re-writable (volatile) memories.

Although the present specification describes components and functions that may be implemented in particular embodiments with reference to particular standards and protocols, the invention is not limited to such standards and protocols. For example, standards for Internet, other packet switched network transmission (e.g., TCP/IP, UDP/IP, HTML, X10, SIP, TR-069, INSTEON, WEP, Wi-Fi and HTTP) and standards for viewing media content (e.g., MPEG and H.264) may represent examples of the state of the art. Such standards are periodically superseded by faster or more efficient equivalents having essentially the same functions. Accordingly, replacement standards and protocols having the same or similar functions as those disclosed herein are considered equivalents thereof.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:
1. An apparatus comprising:
a display interface;
a processor; and
a memory of a customer premises equipment device, wherein the memory comprises:
instructions executable by the processor; and
a plurality of media files comprising user assistance information, wherein the instructions are executable by the processor to perform operations including:
accessing a particular media file of the plurality of media files;
sending content of the particular media file to a display device via the display interface in response to a user request to tune to a troubleshooting television channel, wherein the particular media file indicates a set of troubleshooting steps;
performing a diagnostic test in response to the user request to tune to the troubleshooting television channel; and
storing, at the memory of the customer premises equipment device, a log associated with the user request for assistance, wherein the log includes a first subset of troubleshooting steps performed at the customer premises equipment device and a second subset of troubleshooting steps not performed at the customer premises equipment device.

2. The apparatus of claim 1, wherein the customer premises equipment device is one of a set-top box device, a residential gateway, and a micro-cell device.

3. The apparatus of claim 1, wherein the operations further include accessing subscriber account information in response to the user request to tune to the troubleshooting television channel and sending to the display interface a message based on the subscriber account information.

4. The apparatus of claim 1, wherein the operations further include sending the log to a service provider.

5. The apparatus of claim 4, wherein the operations further include receiving an updated user assistance media file from the service provider, wherein the updated user assistance media file is selected based on the log and information logged at other customer premises equipment devices associated with the service provider.

6. The apparatus of claim 1, wherein the user request to tune to the troubleshooting television channel is received at the customer premises equipment device from a remote control device, a voice entry, or any combination thereof.

7. The apparatus of claim 1, wherein the media files comprise a video demonstrating power cycling the customer premises equipment device, checking a connection between the customer premises equipment device and a residential gateway coupled to the customer premises equipment device, checking a connection between the residential gateway and another network device, or any combination thereof.

8. The apparatus of claim 1, wherein the particular media file is selected based on the diagnostic test performed at the customer premises equipment device in response to the user request to tune to the troubleshooting television channel.

9. The apparatus of claim 1, wherein the diagnostic test comprises:
   testing a picture quality of an output signal of the customer premises equipment device by displaying a video clip and prompting a user of the customer premises equipment device for input regarding an observed problem,
   testing a connectivity between the customer premises equipment device and another customer premises equipment device,
   testing a connectivity between the customer premises equipment device and an internet protocol television network,
   testing a wireless connectivity associated with the customer premises equipment device,
   testing a local area network connectivity associated with the customer premises equipment device,
   testing a synchronization between audio data and video data, testing a telephone audio quality,
   or any combination thereof.

10. The apparatus of claim 1, further comprising an audio processor, wherein the media files further comprise a benchmark audio file and wherein the diagnostic test comprises playing the benchmark audio file over a phone circuit and determining audio characteristics of the played benchmark audio file at the audio processor.

11. The apparatus of claim 1, wherein the media files further comprise a benchmark video file and wherein performing the diagnostic test includes testing synchronization between video data of a program played at the customer premises equipment device and audio data of the program by:
   playing the benchmark video file;
   monitoring channel buffers for audio and video position markers that are embedded in the played benchmark video file; and
   matching an audio position marker to a video position marker.

12. The apparatus of claim 1, wherein the diagnostic test comprises sending a video clip to the display interface and prompting a user of the customer premises equipment device for input regarding an observed problem.

13. The apparatus of claim 5, wherein the updated user assistance media files are selected in response to a problem being identified as a frequently occurring problem, wherein the updated user assistance media files are received independently of whether a user associated with the customer premises equipment device requests assistance with the problem.

14. The apparatus of claim 1, wherein the operations further comprise periodically sending logs to a service provider via a push mechanism or a pull mechanism.

15. A method, comprising:
   at a customer premises equipment device that stores a plurality of user assistance media files:
   receiving a user request to tune to a troubleshooting television channel information;
   accessing a particular user assistance media file in response to the user request to tune to the troubleshooting television channel, wherein the particular user assistance media file indicates a set of troubleshooting steps;
   sending content of the particular user assistance media file to a display device;
   performing a diagnostic test in response to the user request to tune to the troubleshooting television channel;
   storing, at the customer premises equipment device, a log associated with the user request, wherein the log includes a first subset of troubleshooting steps performed at the customer premises equipment device and a second subset of troubleshooting steps not performed at the customer premises equipment device;
   sending the log to a content server; and
   receiving at the customer premises equipment device from the content server an updated media file in response to a problem being identified as a frequently occurring problem, wherein the updated media file is received independently of whether a user associated with the customer premises equipment device requests assistance with the problem.

16. The method of claim 15, wherein the log indicates results of the diagnostic test, the method further comprising:
   transmitting the log information to a customer assistant agent associated with a customer service provider; and
   sending content of the updated media file to the display device.

17. A processor-readable storage device comprising instructions that, when executed by a processor, cause the processor to perform operations including:
   at a set-top box device that stores a plurality of user assistance media files, receiving a user request to tune to a troubleshooting television channel;
   accessing a particular user assistance media file in response to the user request to tune to the troubleshooting television channel, wherein the particular user assistance media file indicates a set of troubleshooting steps;
   sending content of the particular user assistance media file to a display device;
   performing a diagnostic test at the set-top box device in response to the user request to tune to the troubleshooting television channel;
   storing log information at the set-top box, wherein the log information includes results of the diagnostic test and wherein the log information includes a first subset of troubleshooting steps performed at the set-top box and a second subset of troubleshooting steps not performed at the set-top box;

transmitting the log information to a customer service agent associated with a service provider;
receiving an updated user assistance media file from the service provider; and
sending content of the updated user assistance media file to the display device.

18. The processor-readable storage device of claim 17, wherein the operations further include:
accessing subscriber account information; and
transmitting a message based on the subscriber account information to the display device.

* * * * *